(12) United States Patent
Dodonov et al.

(10) Patent No.: US 10,191,856 B2
(45) Date of Patent: *Jan. 29, 2019

(54) METHOD OF MANAGING WEB BROWSER CACHE SIZE USING LOGICAL RELATIONSHIPS AND CLUSTERING

(71) Applicant: YANDEX EUROPE AG, Lucerne (CH)

(72) Inventors: Alexey Vladimirovich Dodonov, Moscow (RU); Ievgen Krasichkov, Lugansk (UA)

(73) Assignee: Yandex Europe AG, Lucerne (CH)

( * ) Notice: Subject to any disclaimer, the term of this patent is extended or adjusted under 35 U.S.C. 154(b) by 147 days.

This patent is subject to a terminal disclaimer.

(21) Appl. No.: 15/324,313

(22) PCT Filed: Jan. 9, 2015

(86) PCT No.: PCT/IB2015/050182
§ 371 (c)(1),
(2) Date: Jan. 6, 2017

(87) PCT Pub. No.: WO2016/005826
PCT Pub. Date: Jan. 14, 2016

(65) Prior Publication Data
US 2017/0168959 A1    Jun. 15, 2017

(30) Foreign Application Priority Data
Jul. 9, 2014 (RU) ................................ 2014127817

(51) Int. Cl.
*G06F 17/30* (2006.01)
*G06F 12/126* (2016.01)
(Continued)

(52) U.S. Cl.
CPC ...... *G06F 12/126* (2013.01); *G06F 17/30902* (2013.01); *G06F 12/12* (2013.01); *G06F 2212/1021* (2013.01)

(58) Field of Classification Search
CPC .. G06F 12/126; G06F 17/30902; G06F 12/12; G06F 2212/1021
(Continued)

(56) References Cited

U.S. PATENT DOCUMENTS 6,542,967 B1    4/2003   Major
8,407,421 B2    3/2013   Steely et al.
(Continued)

FOREIGN PATENT DOCUMENTS

EP    1046997 B1    7/2009
RU    2316131 C2    1/2008

OTHER PUBLICATIONS

International Search Report for PCT/IB2015/050182, dated Jun. 10, 2015, Shane Thomas.
(Continued)

*Primary Examiner* — Hong C Kim
(74) *Attorney, Agent, or Firm* — BCF LLP

(57) ABSTRACT

Disclosed are systems and methods for managing a browser cache. An example method comprises storing in a browser cache on a user device information of web pages visited by a user during one or more web browsing sessions; determining logical relationships among the web pages stored in the cache; associating the web pages with one or more clusters based on the determined logical relationships; upon detecting a usage size of the cache equal to or exceeding a threshold value, identifying information associated with the one or more clusters in the cache; determining a web page or a cluster of web pages to be deleted from the cache based on the identified information; and deleting from the cache
(Continued)

one or more web pages based on the identified information associated with each of the one or more clusters.

20 Claims, 6 Drawing Sheets

(51) Int. Cl.
*G06F 13/00* (2006.01)
*G06F 12/12* (2016.01)

(58) Field of Classification Search
USPC ......... 711/133; 709/217, 218, 219; 707/607, 707/609, 617
See application file for complete search history.

(56) References Cited

U.S. PATENT DOCUMENTS

| 9,916,390 | B2* | 3/2018 | Dodonov | ............ | G06F 17/30902 |
| 2003/0142871 | A1 | 7/2003 | Ishikawa | | |
| 2006/0085519 | A1 | 4/2006 | Goode et al. | | |
| 2006/0230234 | A1 | 10/2006 | Bentolila et al. | | |
| 2008/0229024 | A1 | 9/2008 | Plamondon | | |
| 2009/0182793 | A1 | 7/2009 | Love et al. | | |
| 2010/0070928 | A1 | 3/2010 | Goodger et al. | | |
| 2012/0233199 | A1 | 9/2012 | Jenkins | | |
| 2012/0260157 | A1 | 10/2012 | Zhu et al. | | |
| 2012/0317363 | A1 | 12/2012 | Uola et al. | | |
| 2013/0007371 | A1 | 1/2013 | Hilerio et al. | | |
| 2013/0013725 | A1 | 1/2013 | Scheevel | | |
| 2013/0238856 | A1 | 9/2013 | Loh et al. | | |
| 2013/0318448 | A1 | 11/2013 | O'Shaugnessy et al. | | |
| 2014/0189495 | A1* | 7/2014 | Jiang | ................. | G06F 17/30902 715/234 |
| 2016/0328485 | A1* | 11/2016 | Dodonov | ............ | G06F 17/30902 |

OTHER PUBLICATIONS

English abstract of RU 2316131 retrieved from Espacenet on Jul. 6, 2016.

* cited by examiner

METHOD OF MANAGING WEB BROWSER CACHE SIZE USING LOGICAL RELATIONSHIPS AND CLUSTERING

CROSS-REFERENCE

The present application claims priority to Russian Patent Application No. 2014127817, filed Jul. 9, 2014, entitled "SYSTEM AND METHOD FOR MANAGING AND ORGANIZING WEB BROWSER CACHE" the entirety of which is incorporated herein.

TECHNICAL FIELD

The disclosure relates generally to the field of Internet search, and more specifically to the systems and methods for logical organization and management of a web browser cache.

BACKGROUND

World Wide Web (WWW) generally comprises a multitude of computer servers having respective databases and a network by which client computing devices can communicate with the computer servers and request and load data. The client device typically uses a "web browser" program to request data, such as web pages, from remote computer servers. Whenever a web browser associated with a client device requests a web page, either by a user specifying a Uniform Resource Locator (URL) or selecting a link in another web page, the web browser locates the server that stores the requested web page and loads the web page into the client device in the form of a HyperText Markup Language (HTML) file. The HTML file may comprise a specification of each component of the web page, such as HTML or Java code, text, graphics, embedded multimedia, links to other web page, etc. Web pages received by the browser may be stored or cached in a memory of the client device and displayed to the user.

Caching of web pages on the client device has number of advantages. It improves an overall access speed to the web page at the client device, because the browser may access the data associated with the web page directly from the client device (e.g., a browser cache), rather than re-requesting the page data from the server. In addition, caching of web pages may allow a user to repeatedly view information within a period of time without retrieving the web pages from the server each time. Moreover, caching of web pages allows an off-line viewing of the cached web pages by the user when a network connection to the server is not available.

However, over time, this caching process may significantly slow down the browser as more data is accumulatively saved to the browser cache. This is at least because the storage space of a browser cache is usually limited and a current use of the browser cache, which involves storage of large amount of web page data, such as code, text, graphics, multimedia, etc., may occupy a considerable amount of system memory space and computing resources thereby reducing the overall system performance. This becomes especially problematic for mobile devices, such as smart phones and tablets, which typically have less available memory and computing resources than personal computers, laptops and servers.

Additionally, updates to previously visited and cached web pages may become available in order to push a change or new feature. But when a same web page is requested for a second time, a web browser may speed up the display time by loading a cached version of the web page locally from the browser cache, which results in less than a current version of the web page being displayed. To make matters worse, anyone who may gain access to the same client device can tell from the browsing history what websites have been visited by the original user, and caching is not limited to web pages, but may also include login IDs, passwords, banking information, and other sensitive data. Therefore, periodic deletion of browser cache contents is desirable. Typically, browser cache contents are deleted automatically in a chronological order with the oldest contests being deleted first. However, it has been shown that this is not the most effective way of clearing browser cache as relevant web pages may be deleted first. It is, therefore, desirable to facilitate effective logical organization and management of a web browser cache, such that the cache may be efficiently cleared of old content in order to improve overall system performance of the client device.

SUMMARY

Disclosed are aspects of systems, methods and computer program products for logical organization and management of a web browser cache.

According to one aspect, an example computer-implemented method for managing a browser cache comprises: storing in a cache of a web browser on a user device information about a plurality of web pages visited by a user during one or more web browsing sessions; determining logical relationships among the plurality of web pages stored in the cache; associating the plurality of web pages with one or more clusters based on the determined logical relationships among the plurality of web pages; upon detecting a usage size of the cache equal to or exceeding a threshold value, identifying information associated with the one or more clusters in the cache; determining a web page or a cluster of web pages to be deleted from the cache based on the identified information associated with each of the one or more clusters; and deleting from the cache one or more web pages based on the identified information associated with each of the one or more clusters.

In one aspect, the logical relationships comprise a contextual relationship among the plurality of web pages.

In one aspect, the logical relationships comprise a temporal relationship among the plurality of web pages in connection with each respective time when each of the plurality of web pages is loaded on the user device.

In one aspect, the logical relationships comprise a similarity of web addresses of at least a portion of the plurality of web pages.

In one aspect, the logical relationships comprise an association of at least a portion of the plurality of web pages with at least one web search.

In one aspect, the logical relationships between a first page and a second page exists when the second pages was opened from a link embedded in the first page.

In one aspect, deleting from the cache one or more web pages further comprises at least one of: deleting one or more web pages that belong to no cluster; deleting one or more web pages from the oldest cluster; deleting from a cluster one or more web pages with the oldest date of loading; deleting one or more web pages from the a cluster with least number of associated web pages; and deleting an entire cluster of web pages with least number of associated web pages.

In one aspect, deleting from the cache one or more web pages further comprises de-clustering one or more web pages from a cluster and deleting from the cache at least a portion of the at least one or more de-clustered web pages.

In one aspect, de-clustering one or more web pages from a cluster includes determining whether to de-cluster a web page from a cluster based on one or more of: time of the last viewing by the user of the web page; time spent by the user viewing the web page; number of operations performed by the user on the web page; and whether the clustered web page is bookmarked by the user.

In one aspect, associating the plurality of web pages with one or more clusters includes setting an inseparability flag for a cluster, which precludes de-clustering and deletion of a portion of contents associated with said cluster.

In one aspect, deleting from the cache one or more web pages includes, checking whether a cluster includes an inseparability flag; and when the cluster includes an inseparability flag: forbidding deletion of one or more web page associated with the cluster; or allowing deletion of all web pages associated with the cluster.

According to another aspect, an example computer-based system for managing a browser cache on a user device comprises: a cache of a web browser configured to store information about a plurality of web pages visited by a user during one or more web browsing sessions; a logical relationship determination module configured to determine logical relationships among the plurality of web pages stored in the cache; a clustering module configured to associate the plurality of web pages with one or more clusters based on the determined logical relationships among the plurality of web pages; a cache size determination module configured to, upon detecting a usage size of the cache equal to or exceeding a threshold value, identify information associated with each of the one or more clusters in the cache; a cluster identification module configured to determine a web page or a cluster of web pages to be deleted from the cache based on the identified information associated with each of the one or more clusters; and a cache deletion module configured to delete from the cache one or more web pages based on the identified information associated with each of the one or more clusters in the cache.

According to another aspect, an example computer-readable storage medium comprising computer-executable instructions for managing a browser cache, the instructions comprising: storing in a cache of a web browser on a user device information about a plurality of web pages visited by a user during one or more web browsing sessions; determining logical relationships among the plurality of web pages stored in the cache; associating the plurality of web pages with one or more clusters based on the determined logical relationships among the plurality of web pages; upon detecting a usage size of the cache equal to or exceeding a threshold value, identifying information associated with the one or more clusters in the cache; determining a web page or a cluster of web pages to be deleted from the cache based on the identified information associated with each of the one or more clusters; and deleting from the cache one or more web pages based on the identified information associated with each of the one or more clusters.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of systems, methods and computer program products for logical organization and management of web browser cache. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Figure 1:
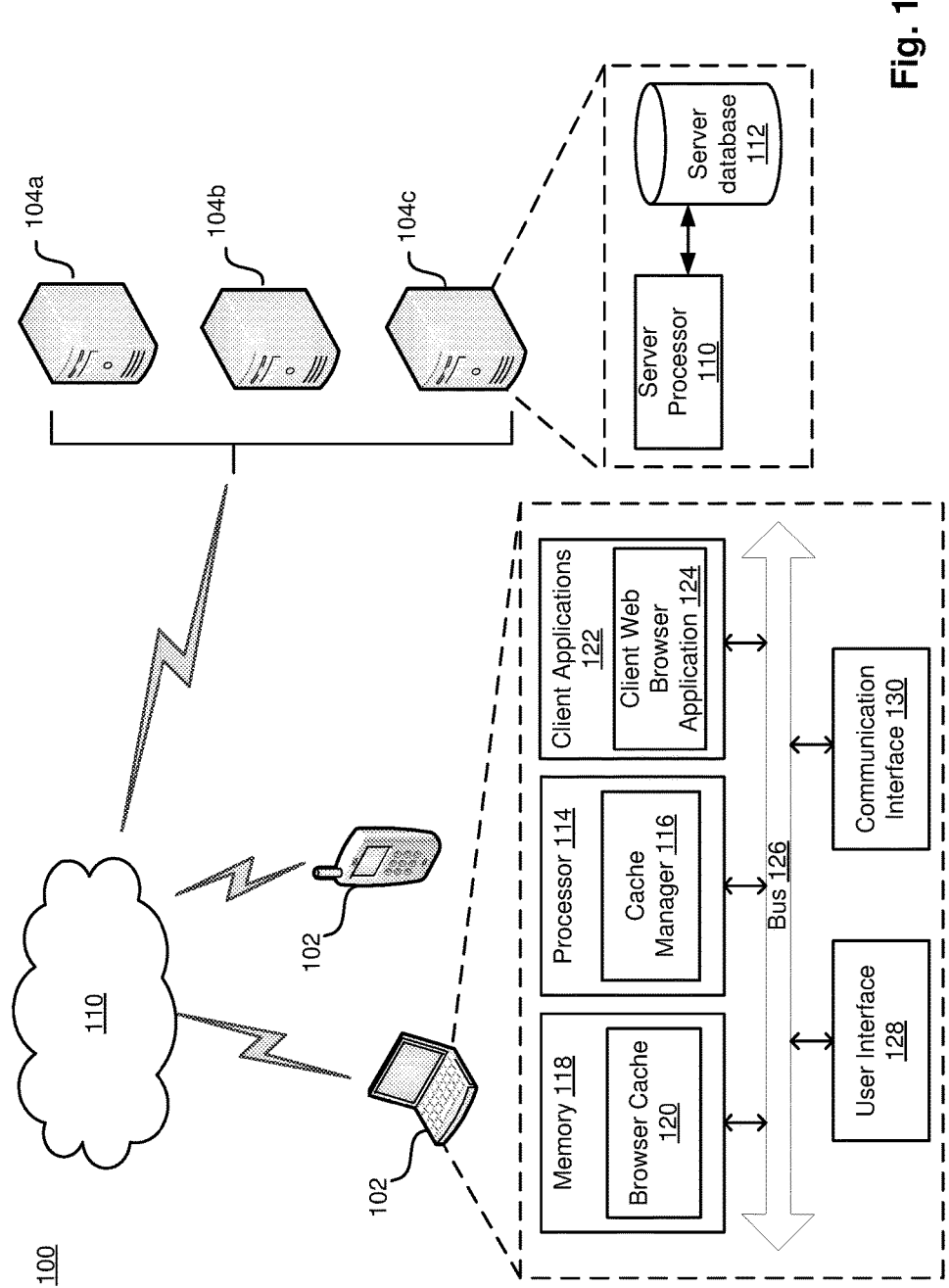
FIG. 1 is a diagram illustrating an example configuration of a system for logical organization and management of a cache associated with a web browser according to one aspect of the invention.

FIG. 1 illustrates an example system 100 for logical organization and management of a cache associated with a web browser of a computing device. The system 100 may include various electronic user or client devices 102 each including any system and/or device, and/or any combination of devices/systems that is capable of establishing a connection, including wired, wireless, or cellular connections with other devices or systems such as a host server and/or application server/content providers 104a-c. The host server and application server/content providers 104a-c can be any server including or connecting with third party servers or service/content providers (e.g., advertisement, promotional content, publication, or electronic coupon servers or services). In one aspect, each of servers 104a-c may include a server processor 110, server database 112, and other modules and components (not shown).

According to one aspect, the client devices 102 may include mobile, hand held or portable devices, wireless devices, or non-portable devices and may be any of, but not limited to, a server desktop, a desktop computer, a computer cluster, or portable devices, including a notebook, a laptop computer, a handheld computer, a palmtop computer, a mobile phone, a cell phone, a smart phone, a PDA, a handheld tablet, a hand held console, a hand held gaming device or console. In one aspect, a user activating a web browser application 124 among a plurality of client applications 122 at one client computing device 102 may communicate over a network 110, such as the Internet, via a wired or wireless connection, to access one or more resources and information at various host server and/or application server/content providers 104*a-c*. Alternatively, the client device 102 and one or more host server and/or application server/content providers 104*a-c* may be directly connected to one another.

A client device 102 may include or otherwise be in communication, via a control/data bus 126, with a processor 114 executing a cache manager 116, a memory 118 including a browser cache 120, multiple client applications 122 including a client web browser application 124, a user interface 128, a communication interface 130. The processor 114 may be implemented as one or more of various processing means such as a microprocessor, a controller, a digital signal processor (DSP), a processing device with or without an accompanying DSP, or various other processing devices including integrated circuits such as an ASIC (application specific integrated circuit), an FPGA (field programmable gate array), a microcontroller unit (MCU), a hardware accelerator, a special-purpose computer chip, processing circuitry, or the like. For example, the processor 114 may be configured to execute instructions stored in the memory 118 or to execute hard coded functionality in response to receiving data or control signals from other modules via the bus 126. As such, whether configured by hardware or software methods, or by a combination thereof, the processor 114 may represent an entity (for example, physically embodied in circuitry) capable of performing algorithms and/or operations described herein when corresponding instructions are executed.

A communication interface 130 may be any means such as a device or circuitry embodied in either hardware, software, or a combination of hardware and software that is configured to receive and/or transmit data from/to the internal bus 126 and/or any other device or module in communication with the client device 102. In this regard, the communication interface 130 may include, for example, an antenna (or multiple antennas) and supporting hardware and/or software for enabling communications with the communication network 110. In some examples, the communication interface 130 may support wired communication using a communication modem and/or other hardware/software for supporting communication via cable, digital subscriber line (DSL), universal serial bus (USB) or other mechanisms.

In a further aspect, a user interface 128 may be in communication with the processor 114 to receive an indication of a user input at the user interface 128 and/or to provide an audible, visual, mechanical or other output to the user. The user interface 128 may include, for example, a keyboard, a mouse, a joystick, a display, a touch screen, soft keys, a microphone, a speaker, or other input/output mechanisms. In this regard, for example, the processor 114 may comprise user interface circuitry configured to control at least some functions of one or more elements of the user interface, such as, for example, a speaker, ringer, microphone, display, and/or the like. The processor 114 and/or user interface circuitry comprising the processor 114 may be configured to control one or more functions of one or more elements of the user interface through computer program instructions (e.g., software and/or firmware) stored on the memory 118 or the like accessible to the processor 114.

The memory 118 may include, for example, one or more volatile and/or non-volatile memories and caches with, e.g., different data storage sizes and speeds. The memory 118 may be configured to store information, data, applications, instructions or the like for enabling the client device 102 to perform various functions in accordance with example aspects of this application. For example, the memory 118 may be configured to buffer input data from user interface 128 via bus 126 for processing by the processor 114. Additionally or alternatively, the memory 118 may be configured to store instructions for execution by the processor 114. In accordance with one aspect of the application, the memory 118 may include a browser cache 120 associated with a web browser of the client device 102. The browser cache 120 may be of a predetermined size (e.g. 100 MB), which is generally based on total available size of the memory 118, requirements of the client web browser application 124 or other criteria known in the art. The browser cache may be dynamically allocated by the processor 114 when user device 102 is powered on or when client web browser application 124 is opened by the user. In one aspect, the contents of the browser cache 120 may be automatically deleted from volatile memory 118 when the device 102 is turned off. In another aspect, the contents of the browser cache 120 may be retained in non-volatile memory 118 even after the device 102 is turned off.

For example, when a user activates a client web browser application 124 of the client device 102 to browse or navigate web pages, the user may use a user interface 128 to instruct underlying operating system of the device 102, via the processor 114, to start and display a web browser window. The web browser application 124 may include, but not limited to, Yandex, Firefox, Internet Explorer, Google Chrome, Opera or Safari. The processor 114 may in turn execute a cache manager 116 to reserve a portion of the memory 118 (e.g., the browser cache 120) for the web browser for storing data and code. As will be described fully below with reference to FIG. 3, the cache manager 116 may perform logical organization and management of the browser cache 120 of the client device 102 according to the principles disclosed herein.

Generally, the user may enter a URL address of a web page to retrieve information from the host server and application server/content providers 104*a-c* or select from previously stored web pages upon activating the client web browser application 124. Web browsers typically have a mechanism for avoiding reloading certain information and resources a user previously retrieved and visited to allow potentially quicker responses to frequently accessed and/or high access cost data than requesting data directly from original data sources such as the host server and/or application server/content providers 104*a-c*.

If, in response to receiving a URL address of a user desired web page, the addressed web page is not available in the browser cache 120 (a cache miss), the web browser application 124 may communicate with the network 110 via, e.g., device drives which control the communication interface 130 of the device 102, to request such web page. One of the host server and application server/content providers 104*a-c* may locate and communicate such web page to the device 102 via the network 110, so that the client web browser application 124 can execute the code of the web page to show the contents of it in the form of a HTML file. Information to reconstruct a web page by a user's device 102 may be stored into the browser cache 120 when the client web browser application 124 accordingly downloads various web pages from the network 110, reads the contents of the files, interprets the commands stored in the files, and builds up the web page on a display of the device 102.

Figure 2:
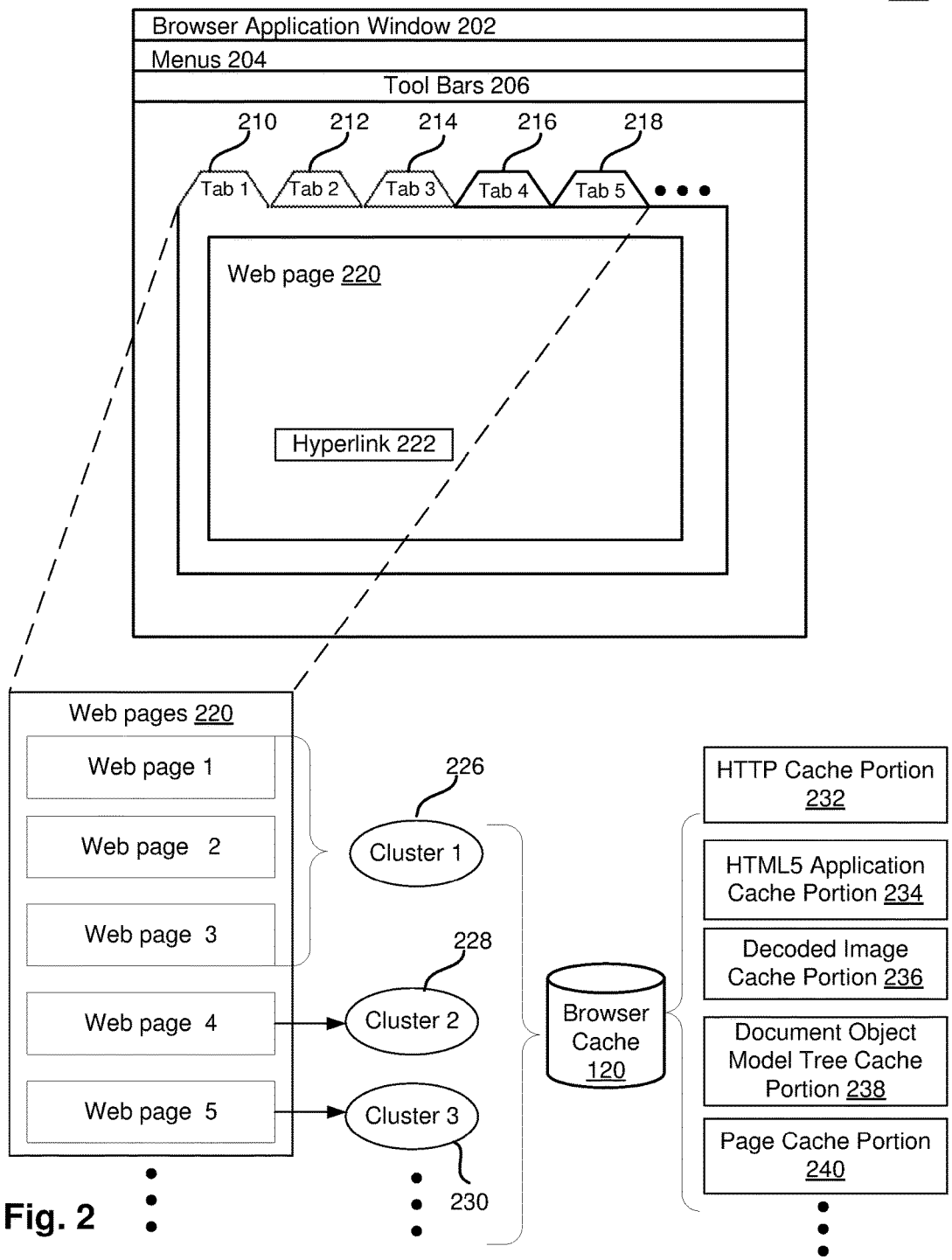
FIG. 2 is a diagram illustrating an example browser application window displaying various browser contents in a tabbed format according one aspect of the invention.

Web browser application 124 may open more than one web page 220 at a time in different browser windows 202 or tabs 210-218. In other words, a web browser may have multiple open web pages 220 at a time. For example, referring to FIG. 2, a browser application window 202 may display various web pages 220 in a tabbed format in accordance with one aspect. More specifically, the client web browser application 124 of FIG. 1 may generate one or more browser windows 202, each of which includes various navigation menu(s) 204 and tool bar(s) 206. Alternatively, browser application window 202 may be arranged differently (e.g., with additional or fewer window items, in a different layout, etc.). Generally, each tab 210, 212, 214, 216, and 218 and/or each open window 202 may include respective browser content information. As shown in FIG. 2, Tab 1, which is "on top" of remaining open tabs or on a top layer and therefore visible, may include web pages 220. In one aspect, a web page 220 may include text, graphics, multimedia and one or more hyperlinks 222, which may be visually represented as text, an icon, an image, an animation, or a combination thereof. Links 222 may be associated with a target URL address, an open-in-new-tab indicator, and other data. In another aspect, link properties may not be visible to a user, but present in browser content 220 and accessible to client web browser application 124. In one example aspect, the web pages 220 open in browser windows 202 and tabs 210-218 may be stored in browser cache 120.

In one example, a user may open web pages 220 in multiple different browsing sessions. A web browsing session may be defined as an interactive data interchange between a client device 102 and a server 104 in connection with a request of one or more server resources, such as one or more web page and all the content associated therewith, such as code, text, graphics, etc. A user may perform multiple browsing sessions substantially contemporaneously or at different times of a day or week. Regardless of when these web pages were open in the current browsing session or in past browsing sessions (e.g., terminated or closed browsing sessions), the contents of these web pages are stored in browser cache 120.

Due to limited memory storage capacity, each respective usage of the memory 118 and the browser cache 120 of the client device 102 may depend on the number of open tabs, number of open windows, number of active web browsing sessions, size of open web pages, and total amount of resources in a current use of the client web browser application 124. Generally, a web browser cache may occupy a considerable amount of system memory space (e.g., 100 MB of overall RAM of an iPhone 4) thereby effecting the system performance of the client device 102. Therefore, it is desirable to effectively organize and manage the browser cache 120 associated with the client web browser application 124 such that the web browser cache 120 may be efficiently cleared of old contents in order to improve overall system performance. According to an advantageous aspect, the web browser application 124 may use a cache manager 116 to perform logical organization and management of browser cache 120.

Figure 3:
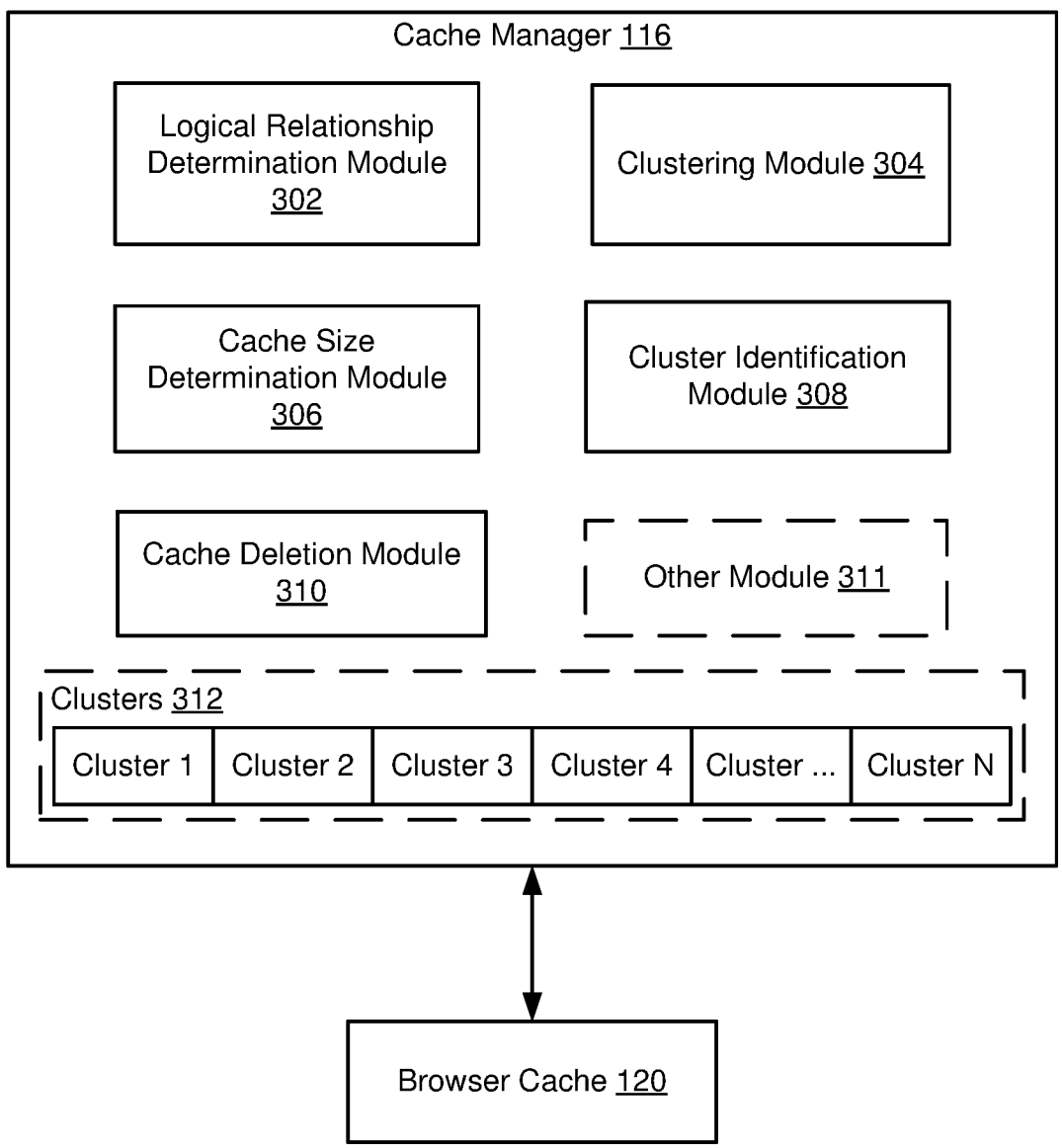
FIG. 3 is a diagram illustrating an example configuration of a cache manager module logical organization and management of a cache associated with a web browser according one aspect of the invention.

FIG. 3 illustrates an example configuration 300 of a cache manager 116 according to one aspect. As shown, cache manager 116 may include a logical relationship determination module 302 which may be configured to determine logical relationships among the plurality of web pages stored in the browser cache 120. The cache manager 116 may further include a clustering module 304 which may be configured to associate the plurality of web pages with one or more clusters based on the determined logical relationships among the plurality of web pages. The cache manager 116 may further include a cache size determination module configured to determine the current usage size of the browser cache 120. The cache manager 116 may further include a cluster identification module 308 which may be configured to determine a web page or a cluster of web pages to be deleted from the cache based on the identified information associated with each of the one or more clusters when a usage size of the cache equal to or exceeding a threshold value. The cache manager 116 may further include a cache deletion module 310 configured to delete from the cache one or more web pages based on the identified information associated with the one or more clusters in the cache. The cache manager 116 may also include other modules 311 used for management of cache 120.

The term "module" as used herein means a real-world device, apparatus, or arrangement of modules implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 below). Accordingly, each module can be realized in a variety of suitable configurations, and should not be limited to any particular implementation exemplified herein.

For example, with reference to FIG. 2, a user may open one or more web pages in different windows or tabs of web browser 200. For example, different web pages 220 may be opened in Tabs 210-218. More specifically, a browser application window 202 may, for example, have 5 tabs opened, in which Tab 212 may be launched corresponding to a first link from Tab 210, and Tab 214 may be a second link from Tab 210. Therefore, Tabs 210, 212, 214 may be determined by the cache manager 116 to be logically related to each other based on various criteria as explained below. The remaining Tab 216 (e.g., corresponding to a news website) and Tab 218 (e.g., corresponding to a e-commerce website) among the five opened tabs may not be related to Tabs 210-214, or to each other. As such, the cached information of Tab 216 and Tab 218 in the browser cache 120, which is unrelated to that of logically united Tabs 210, 212, 214, may be clustered as in a minority position than that of Tabs 210-214 and may be cleared first under certain conditions, as will be explained in greater detail below.

In one example, when resources and information associated with each requested web page are fully or partially loaded on the client device 102 from the host server and/or application server/content providers 104a (e.g., all the associated resources and information are obtained and downloaded by the browser cache 120), the cache manager 116 may allocate a portion of the browser cache 120 for, e.g., a HTTP cache portion 232 for web resources, a HTML5 application cache portion 234, decoded images cache portion 236, and a document object model (DOM) tree cache portion 238, for temporary storage of the downloaded web page contents. The document object model is an application programming interface (API) for valid HTML and well-formed XML documents, and defines the logical structure of documents and the way a document is accessed and manipulated. The browser cache 120 may additionally include a page cache portion 240 for storing visited web pages (web pages shown by the web browser 200). The page cache portion 240 may allow fast back-forward navigation by "pausing" a page and show the previously visited web pages quickly when the user navigates back to the same page. Usually, the page cache portion 240 may store all resources related to a main HTML page and the HTTP cache portion 232 may store each resource individually.

For a fully loaded web page, the cache manager 116 may automatically generate a web page identifier or the like (e.g., certain specific signature data) that uniquely describes the contents of the obtained resources and information, which may or may not be the URL of the resources and information (e.g., a globally unique identifier (GUID)). In one example, the cache manager 116 may perform an algorithm (e.g., a hash operation, a message-digest algorithm (e.g., "MD5"), and/or a similar algorithm) to generate the web page identifier. In another example, the operations, algorithms, and/or routines used to generate the web page identifier may be standardized and known to other computing devices within a shared network (e.g., network 110 in FIG. 1), such that all these computing devices sharing the same network may generate identical identifiers when dealing with a same web page.

According to an aspect, the cache manager 116 may then activate a logical relationship determination module 302, shown in FIG. 3, to determine whether web pages opened in Tabs 210, 212, 214, 216, 218 during current browsing sessions, and one or more web pages already stored in the browser cache 120 from the previous (e.g., now terminated) browsing sessions, are logically related to one another. For example, a logical relationship between two or more web pages may be established based on a contextual similarity of contents and resources shared by these web pages. For example, two or more web pages discussing automotive news and new car models are contextually similar and, therefore, logically related to each other. In another example, when two or more pages were retrieved by a web browser in response to a single search query from the user, then these web pages are also logically related. In another example, the logical relationship may include a temporal relationship among the plurality of web pages in connection with each respective time when each of the plurality of web pages is retrieved and searched. For example, if two or more web pages were opened by a user within short period of time (e.g., within 10 minutes), then these pages may be temporally related. In another example, the logical relationship may include a similarity of web addresses of at least a portion of the plurality of web pages. For example, two or more web pages downloaded from the same domain (e.g., cnet.com) are also related. Yet in another example, the logical relationships between a first page and a second page may exist when the second pages was opened from a link embedded in the first page. Other types of logical relationships between web pages may be recognized in other aspects.

Subsequently, the cache manager 116 may use a clustering module 304 of FIG. 3 to associate one or more web pages 220 with one or more clusters 312 based on logical relationships established between the one or more open web pages 220 and previously cached web pages, which may be already associated with one or more clusters 312. In one example aspect, in case no logical relationship is established between a web page and other cached web pages, then this web page may not be associated with any of the clusters 312 and, thus, stored separately in the browser cache 120. Yet in another aspect, a single web page 220 and all resources associated therewith (e.g., code, text, images, multimedia, links, embedded advertisements, etc.) may be associated with a separate cluster 312 with which no other web page is associated. This single web page-cluster association allows logical grouping of all resources associated with a particular web page in a single cluster associated only with this web page, which allows faster retrieval of web page resources and prevents inadvertent deletion of web page resources associated with this cluster during clearing of the browser cache 312.

In one example aspect, the clustering module 304 may be further configured to de-cluster a cluster (i.e., separate a portion of content of the cluster). For example, if a cluster is associated with multiple related web pages, one or more of associated web pages may the de-clustered from a cluster. In another example, if a cluster is associated with a single web page, a portion of web page contents (e.g., resource-intensive flash animation, embedded advertisements, high resolution images, etc.) may be de-clustered from the cluster. The de-clustering of a cluster may be used, for example, for easier deletion of the de-clustered content from the browser cache 312. In one example aspect, the cache manager 116 may consider the following criteria that assess an importance of the web page contents to the user in determining whether to de-cluster certain content from a cluster: time of the last request of a particular content of the cluster (e.g., opening of a web page, loading of an image, access of a URL, etc.); time spent by the user viewing the clustered web page; number of operations within the web page (e.g., viewing of embedded multimedia content, opening of URLs, etc.); whether the clustered web page is bookmarked by the user. Based on these and other criteria the cache manager 116 may determine which of the clusters are more important to the user and which are less so. For example, a cluster associated with web pages which were recently opened, or web pages which the user spent a longer period of time viewing (e.g., more than 5 minutes) and made large number of operations (e.g., 3 or more operations), may be considered more important by the cache manager 116 than a cluster associated with older web pages (e.g., viewed by the user more than 2 hours ago), or which the user viewed briefly (e.g. for less than 1 minute). The cache manager 116 may then instruct clustering module 304 to de-cluster web page content associated with less important web pages. The de-clustering of certain web page content allows easier deletion of this content from the browser cache 120.

In one example aspect, a cluster associated with one or more web pages may include an inseparability flag that assures that no contents associated with this cluster is de-clustered and deleted separately from other contents of that cluster. For example, this inseparability flag may be used for information associated with a specific web page only if the web page has been fully loaded, such that right from this moment, the retrieved and stored resources and information associated with the unique identifier of this specific web page become at least a portion of an entire inseparable cluster whose status or integrity may be checked by the cache manager 116. In another example, the inseparability flag used on a cluster containing several related web pages indicates that all web pages associated with this cluster should be treated by cache manager 116 together for purpose of management and deletion of these pages. If the retrieved and cached resources and information associated with a web page identifier has no inseparability flag, the cache manager 116 may manage or delete these resources and information in the browser cache 120 separately from other contents of this cluster. Removing an inseparability flag from cache members associated with a web page identifier may separate the resources and information associated with an existing cluster in the browser cache 120.

Figure 4:
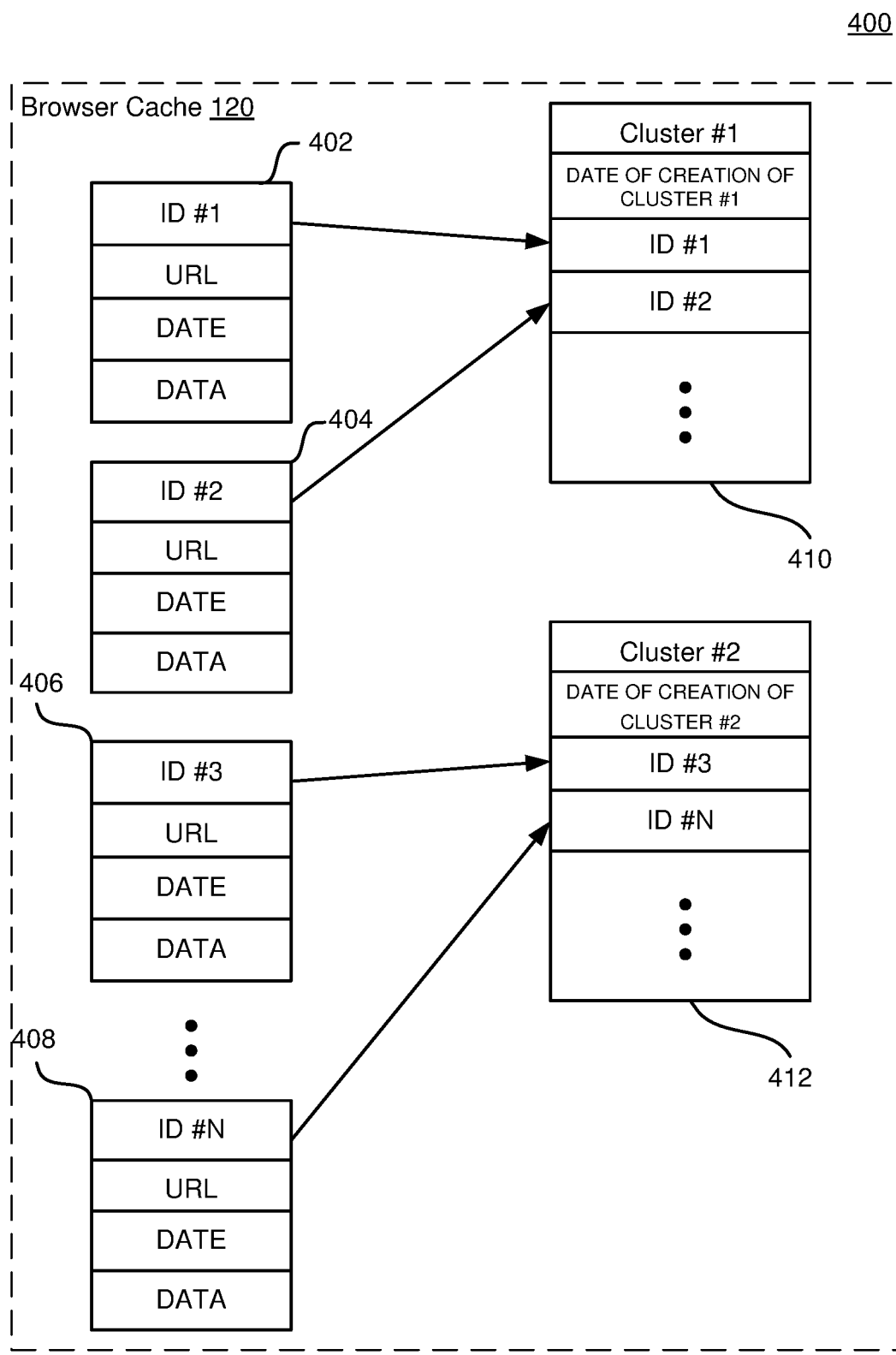
FIG. 4 is a diagram illustrating an example configuration of the cache associated with a web browser according one aspect of the invention.

In a further aspect, the cache manager 116 may maintain a list/table of clusters 312 containing information about logically related web pages 220. In one example aspect, clusters 312 may be stored separately by the processor 114 in an operating memory used to run cache manager 116, as shown in FIG. 3. In one example aspect, the clusters 312 may be stored in the browser cache 120 along with other contents of the cache 120, as shown in FIG. 4. Regardless of where these clusters are stored, each cluster 312 may have an example configuration shown in FIG. 4. Particularly, as depicted, each cluster 312 may include a unique cluster identifier, a date of creation of the cluster, which may correspond to the date of loading the oldest web page associated with this cluster, a list of identifiers of web pages from the cache 120 associated with each cluster, and an inseparability flag (not shown).

In general, FIG. 4 depicts a diagram illustrating an example configuration 400 of the cache associated with a web browser. More specifically, as shown in FIG. 4, web pages currently opened in Tabs 210, 212, 214 of the web browser 124, as well as previously opened (and now closed) web pages may be logically represented as data blocks 402, 404, 406 and 408 in the browser cache 120. Each data block 402-408 may include, but not limited to, a unique identifier (e.g., GUID), a URL(s) of the web page stored therein, the date of the most recent retrieval of the web page from, e.g., the host server and application server/content providers 104a-c, and data associated with the web page. In one aspect, the information contained in each data block 402-408 may be collected from various cache portions 232-240 of the browser cache 120. The clustering module 304 may be configured to associate data blocks 402 and 404 with Cluster #1 410 in accordance with the determined logical relationship among the plurality of web pages rendered in Tabs 210, 212, and associate data blocks 406 and 408 with Cluster #2 412 in accordance with the determined logical relationship among the plurality of web pages rendered in Tabs 214, 216. In one aspect, a single data block may be associated with two or more different clusters if the contents of these data blocks are logically related to two or more clusters.

For example, referring back to FIG. 2, web pages 1-3 open in Tabs 210, 212, 214 may be determined by the logical relationship determination module 302 to be logically related to one another based on, e.g., a temporal relationship among these web pages in connection with each respective time when each of the plurality of web pages is originally loaded or reloaded, based on similarity of web addresses of these web pages, based on association with at least one search query of the user, or other criteria, and associated by the clustering module 304 with Cluster #1 226. While, web pages 4 and 5 open in Tabs 216 and 218, respectively, may be found by the logical relationship determination module 302 to be logically unrelated and associated by the clustering module 304 with Cluster #2 228 and Cluster #3 230, respectively.

In another aspect, the cache manager 116 may further use a cache size determination module 306 of FIG. 3 to monitor the usage size of the browser cache 120 and to detect when the usage size of the browser cache 120 is equal to or exceeding a predetermined threshold value. The threshold value may be defined as a maximum cache volume (e.g., 85% of the maximum cache capacity) that should be maintained by the cache manager 116 in order to prevent unexpected cache overload. This threshold value may be specified (and adjusted if necessary) by the cache manager 116 and may depend on the overall size of the browser cache 120, type of the device 102 (e.g., smartphone, personal computer, etc.), type of the web browser application 124 (e.g., Yandex, Chrome, etc.), an average size of downloaded web pages, a frequency of downloading of new web pages, type of network connection (e.g., cellular, Ethernet), available network bandwidth, or other criteria. Generally, the browser cache 120 may be maintained at 85% capacity to assure that there is always enough space in the browser cache 120 to fully load a new web page without needing to delete another web page from the browser cache 120.

In another aspect, when the cache size determination module 306 determines that the current usage size of the browser cache 120 is equal to or exceeds a predetermined threshold value, the cache manager 116 may use a cluster identification module 308 to identify information associated with the one or more clusters 312 and determine, based on identified information, a web page or a cluster of web pages to be deleted from the cache 120 in order to reduce the usage size of the web cache 120 below the threshold value. The cluster identification module 308 may use different criteria in determining which web pages should be deleted first based on logical relationships between cached web pages. In one example aspect, clusters with larger number of related web pages may have higher preference over clusters with a lower number of related web pages based on the premise that a user who viewed many related web pages (e.g., contextually, temporarily or otherwise) is more interested in these web pages, and thus more likely to return of one of these web page (e.g., request reload of one of these web pages from browser cache 120), then when a user viewed multiple unrelated web pages or only several related web pages. To that end, a single or stand alone web page not associated with any existing clusters in the browser cache 120 may be deleted first, followed by clusters with only several related web pages (e.g., 2 to 5 web pages), and then followed by clusters with a large number of related web pages (e.g., greater than 5 web pages).

When determining whether to delete one or more pages within an identified cluster (or even an entire cluster of web pages), the cluster identification module 308 may consider the date of creation of the cluster and/or dates of loading of individual web pages associated with this cluster. For example, the cluster identification module 308 may determine to delete the oldest web pages within the identified cluster first. In another example, the cluster identification module 308 may delete an entire cluster of pages if the date of creation of the cluster or the date of loading of the last (i.e., most recent) web page associated with this cluster exceeds a predetermined time threshold (e.g., 2 hours). In one aspect, if a cluster has an inseparability flag set, the cluster identification module 308 may only designate for deletion all or none of the web pages associated with this cluster. In other words, contents of this cluster (whether it includes one or more web pages) cannot be deleted separately from each other, they have to be deleted together. In another aspect, the cluster identification module 308 may take into account the size of web pages stored in the browser cache 120 to assure that deletion of the designated web pages (or clusters of web pages) does in fact brings the overall usage size of the browser cache 120 below the threshold value. In this manner, the cluster identification module 308 may identify one or more web pages for deletion from the browser cache 120.

In another aspect, the cache manager 116 may use a cache deletion module 310 of FIG. 3 to delete from the browser cache 120, e.g., one or more web pages (or clusters of web pages) identified by the cluster identification module 308. Particularly, the cache deletion module 310 receives from the cluster identification module 308 unique identifies of web pages in the browser cache 120 that were marked for deletion. The cache deletion module 310 then de-clusters (i.e., separates) from the clusters the unique identifies of identified web pages. The cache deletion module 310 then deletes from the browser cache 120 at least a portion of the at least one or more de-clustered web pages. The cache deletion module 310 may also remove from all clusters records of the deleted web pages, and, in case an entire cluster of web pages is marked for deletion, remove the record of this cluster from browser cache 120.

In one example aspect, a single cluster may be associated with a single web page. In this case, the client web browser application 124 may inquire the cache manager 116 regarding the integrity of a specific cluster in the browser cache 120, such that an entire web page may be reloaded into the browser in online or offline mode without requesting any contents of the web page from the host server and/or application server/content providers 104a-c. In one aspect, a cluster associated with a single web page may be marked with an inseparability flag to assure that no contents of the associated web page are deleted from the cache 120, so that the web page is retrieved from the browser cache 120 in its entirety when requested by the browser.

Figure 5:
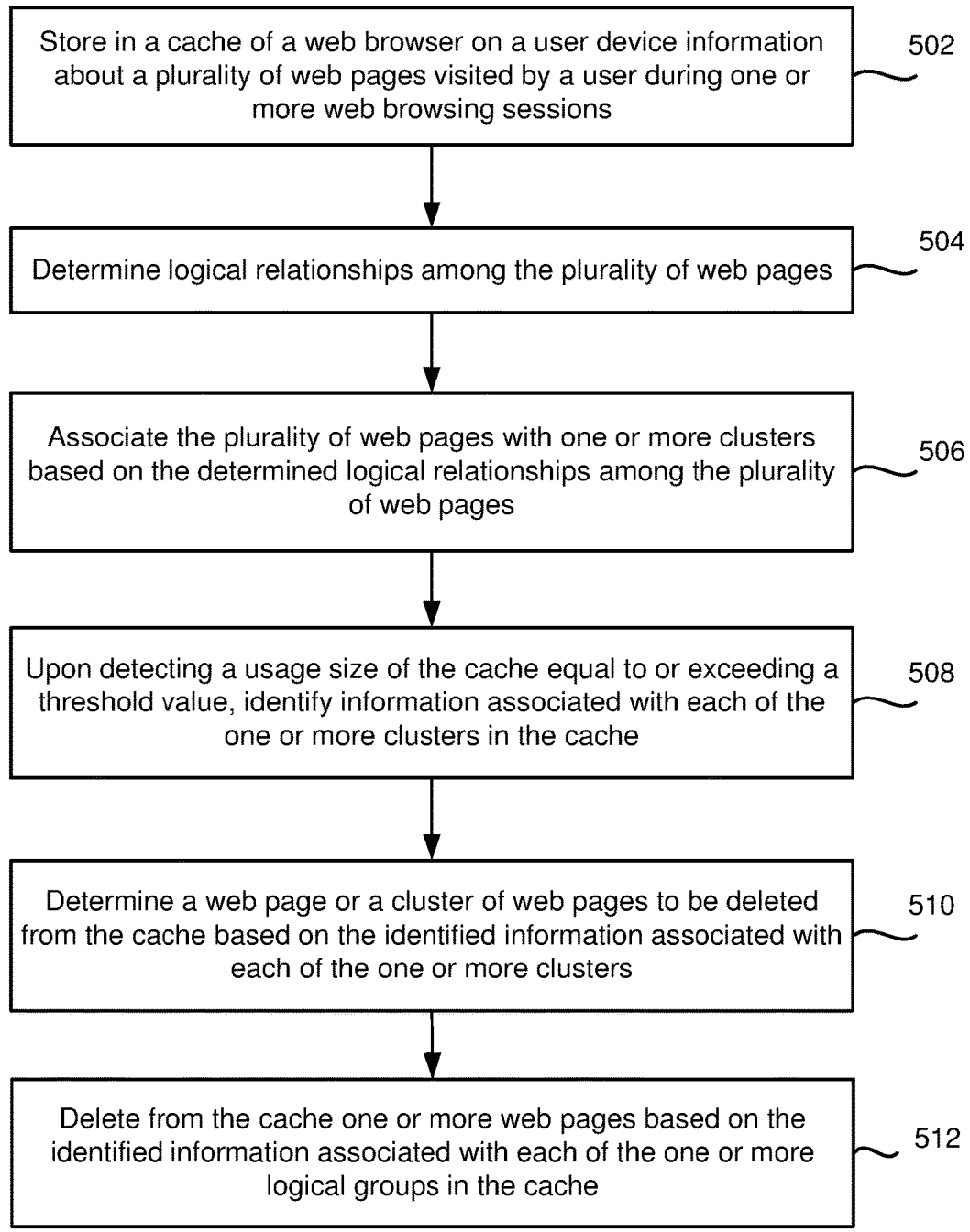
FIG. 5 is a flow diagram illustrating an example method for logical organization and management of a cache associated with a web browser according one aspect of the invention.

FIG. 5 depicts an example method for logical organization and management of a web browser cache according to one example aspect. The method 500 may be implemented by the systems of FIGS. 1-4. At step 502, the method 500 may include storing in a cache of a web browser (e.g., browser cache 120 of memory 118 of FIG. 1) on a user device (client device 102) information about a plurality of web pages visited by a user during one or more web browsing sessions. At step 504, a cache manager 116 of processor 114 of FIG. 1 may configure a logical relationship determination module 302 of FIG. 3 to determine logical relationships among the plurality of web pages stored in the browser cache 120. At step 506, the cache manager 116 may configure a clustering module 304 to associate the plurality of web pages with one or more clusters based on the determined logical relationships among the plurality of web pages. At step 508, upon detecting a usage size of the cache equal to or exceeding a threshold value, the cache manager 116 may configure a cache size determination module 306 to identify information associated with the one or more clusters in the browser cache 120. At step 510, the cache manager 116 may determine a web page or a cluster of web pages to be deleted from the cache based on the identified information associated with each of the one or more clusters. At step 512, the cache manager 116 may configure a cache deletion module 308 to delete from the browser cache 120 one or more web pages based on the identified information associated with each of the one or more clusters in the browser cache 120.

Figure 6:
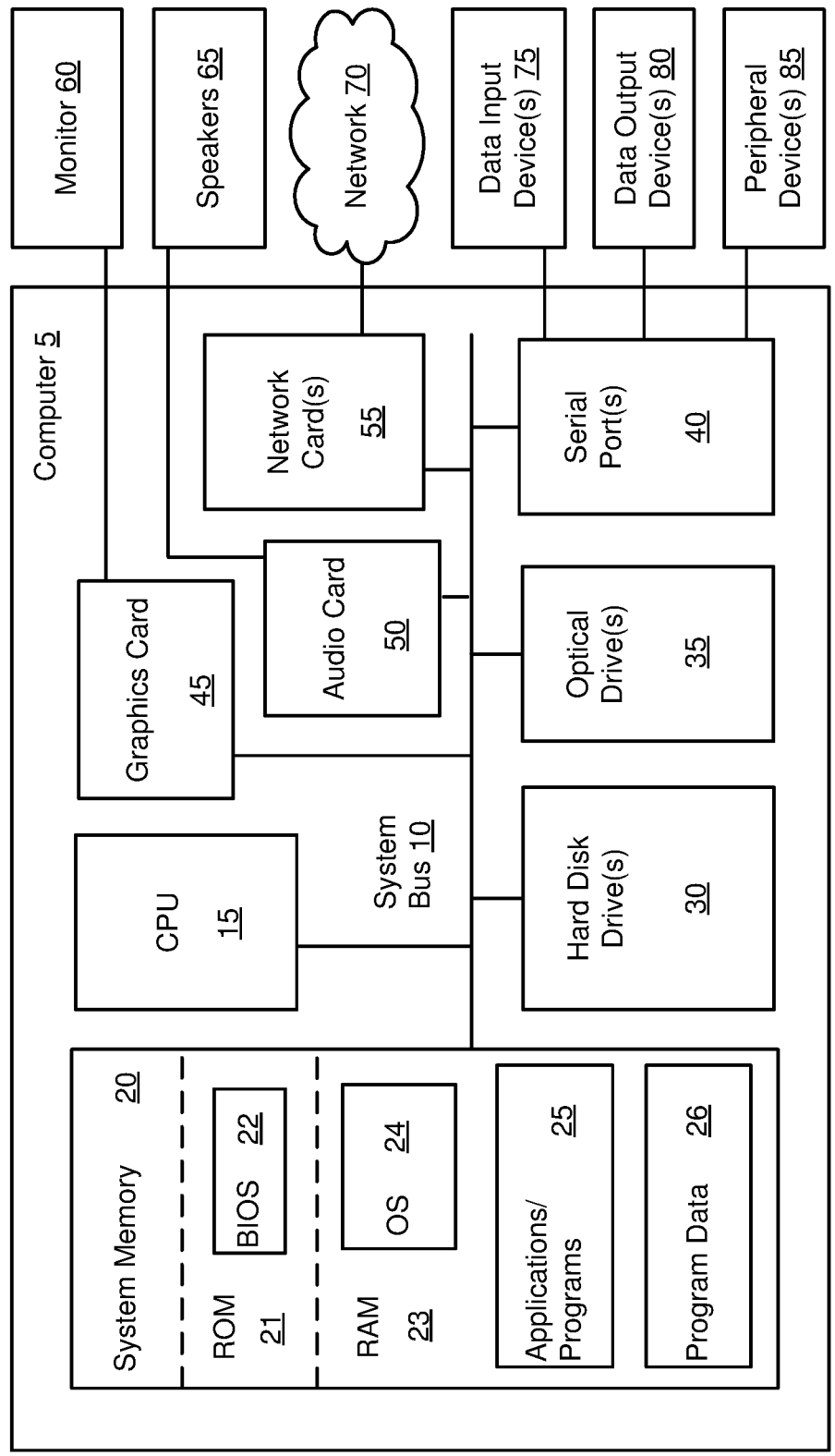
FIG. 6 is a diagram illustrating an example general-purpose computer system on which the systems and methods for logical organization and management of a cache associated with a web browser in accordance with aspects of the invention.

FIG. 6 depicts one example aspect of a computer system 5 that may be used to implement the disclosed devices and methods for logical organization and management of a web browser cache. The computer system 5 may include, but not limited to, a personal computer, a notebook, tablet computer, a smart phone, a mobile device, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for managing a browser cache, the method comprising:
    storing in a cache of a web browser on a user device a plurality of web pages visited by a user during one or more web browsing sessions;
    generating a web page identifier for each web page of the plurality of web pages;
    defining a plurality of clusters of the plurality of web pages stored in the cache by:
        determining logical relationships among the plurality of web pages stored in the cache, and
        associating each web page of the plurality of web pages with one or more clusters of the plurality of clusters based on the determined logical relationships among the plurality of web pages such that each given cluster of the plurality of clusters includes at least one web page of the plurality of web pages, a list of identifiers, and a unique cluster identifier, the list of identifiers including the web page identifier of each web page of the at least one web page of the given cluster;
    upon detecting a usage size of the cache equal to or exceeding a threshold value, determining, based on information associated with the plurality of clusters, at least a portion of at least one cluster of the plurality of clusters to be deleted from the cache, the information associated with the plurality of clusters including at least: (i) the list of identifiers and (ii) the unique cluster identifier of each cluster of the plurality of clusters; and
    deleting from the cache at least the portion of the at least one cluster based on at least one corresponding web page identifier of the list of identifiers of the at least one cluster.

2. The method of claim 1, wherein the logical relationships comprise a contextual relationship among the plurality of web pages.

3. The method of claim 1, wherein the logical relationships comprise a temporal relationship among the plurality of web pages in connection with each respective time when each of the plurality of web pages is loaded on the user device.

4. The method of claim 1, wherein the logical relationships comprise a similarity of web addresses of at least a portion of the plurality of web pages.

5. The method of claim 1, wherein the logical relationships comprise an association of at least a portion of the plurality of web pages with at least one web search.

6. The method of claim 1, wherein the logical relationships between a first page and a second page exists when the second page was opened from a link embedded in the first page.

7. The method of claim 1, comprising at least one of:
    deleting one or more web pages that belong to no cluster;
    deleting one or more web pages from an oldest cluster of the plurality of clusters;
    deleting from a given cluster of the plurality of clusters one or more web pages with an oldest date of loading;
    deleting one or more web pages from the a given cluster of the plurality of clusters with least number of associated web pages; and
    deleting an entire cluster of the plurality of clusters of web pages with least number of associated web pages.

8. The method of claim 1, wherein the deleting from the cache at least the portion of the at least one cluster comprises de-clustering one or more web pages from the at least one cluster and deleting from the cache at least a portion of the de-clustered one or more web pages.

9. The method of claim 8, wherein the de-clustering one or more web pages includes determining whether to de-cluster the one or more web pages based on one or more of:
    time of the last viewing by the user of the one or more web pages;
    time spent by the user viewing the one or more web pages;
    number of operations performed by the user on the one or more web pages; and
    whether the one or more web pages are bookmarked by the user.

10. The method of claim 1, wherein the associating each web page of the plurality of web pages with the one or more clusters of the plurality of clusters includes setting an inseparability flag for a given cluster of the plurality of clusters, the inseparability flag precluding de-clustering and deletion of a portion of contents associated with said given cluster.

11. The method of claim 10, wherein deleting from the cache at least the portion of the at least includes,
    checking whether the at least one cluster includes the inseparability flag; and
    when the at least one cluster includes the inseparability flag, deleting the at least one cluster in its entirety from the cache.

12. A computer-based system for managing a browser cache on a user device, the system comprising:

a cache of a web browser configured to store a plurality of web pages visited by a user during one or more web browsing sessions; and a cache manager configured to:
  generate a web page identifier for each web page of the plurality of web pages, and
  define a plurality of clusters of the plurality of web pages stored in the cache by using:
    a logical relationship determination module determining logical relationships among the plurality of web pages stored in the cache, and
    a clustering module configured to associate the plurality of web pages with one or more clusters of the plurality of clusters based on the determined logical relationships among the plurality of web pages such that each given cluster of the plurality of clusters includes at least one web page of the plurality of web pages, a list of identifiers, and a unique cluster identifier, the list of identifiers including the web page identifier of each web page of the at least one web page of the given cluster;

the cache manager further configured to delete from the cache at least a portion of at least one cluster of the plurality of clusters by using:
  a cache size determination module configured to, upon detecting a usage size of the cache equal to or exceeding a threshold value, identify information associated with the plurality of clusters in the cache, the information associated with the plurality of clusters including at least: (i) the list of identifiers and (ii) the unique cluster identifier of each cluster of the plurality of clusters;
  a cluster identification module configured to determine at least the portion of the at least one cluster to be deleted from the cache based on the identified information associated with the plurality of clusters; and
  a cache deletion module configured to delete from the cache at least the portion of the at least one cluster based on at least one corresponding web page identifier of the list of identifiers of the at least one cluster.

13. The system of claim 12, wherein the logical relationships comprise a contextual relationship among the plurality of web pages.

14. The system of claim 12, wherein the logical relationships comprise a temporal relationship among the plurality of web pages in connection with each respective time when each of the plurality of web pages is loaded on the user device.

15. The system of claim 12, wherein the logical relationships comprise a similarity of web addresses of at least a portion of the plurality of web pages.

16. The system of claim 12, wherein the logical relationships comprise an association of at least a portion of the plurality of web pages with at least one web search.

17. The system of claim 12, wherein the logical relationships between a first page and a second page exists when the second page was opened from a link embedded in the first page.

18. The system of claim 12, wherein the cache deletion module is further configured to perform at least one of:
  deleting one or more web pages that belong to no cluster;
  deleting one or more web pages from an oldest cluster of the plurality of clusters;
  deleting from a given cluster of the plurality of clusters one or more web pages with an oldest date of loading;
  deleting one or more web pages from the a given cluster of the plurality of clusters with least number of associated web pages; and
  deleting an entire cluster of the plurality of clusters of web pages with least number of associated web pages.

19. The system of claim 12, wherein the deleting from the cache at least the portion of the at least one cluster comprises de-clustering one or more web pages from the at least one cluster and deleting from the cache at least a portion of the de-clustered one or more web pages.

20. The system of claim 12, wherein the de-clustering one or more web pages includes determining whether to de-cluster the one or more web pages based on one or more of:
  time of the last viewing by the user of the one or more web pages;
  time spent by the user viewing the one or more web pages;
  number of operations performed by the user on the one or more web pages; and
  whether the one or more web pages are bookmarked by the user.

\* \* \* \* \*

UNITED STATES PATENT AND TRADEMARK OFFICE
CERTIFICATE OF CORRECTION

PATENT NO. : 10,191,856 B2  Page 1 of 1
APPLICATION NO. : 15/324313
DATED : January 29, 2019
INVENTOR(S) : Alexey Vladimirovich Dodonov et al.

It is certified that error appears in the above-identified patent and that said Letters Patent is hereby corrected as shown below:

In the Claims

Claim 7, Column 16, Lines 32-34, "deleting one or more web pages from the a given cluster of the plurality of clusters with least number of associated web pages; and" should read --deleting one or more web pages from the given cluster of the plurality of clusters with least number of associated web pages; and--

Claim 11, Column 16, Lines 59-60, "The method of claim 10, wherein deleting from the cache at least the portion of the at least includes," should read --The method of claim 10, wherein deleting from the cache at least the portion of the at least one cluster includes,--

Claim 18, Column 18, Lines 24-26, "deleting one or more web pages from the a given cluster of the plurality of clusters with least number of associated web pages; and" should read --deleting one or more web pages from the given cluster of the plurality of clusters with least number of associated web pages; and--

Signed and Sealed this
Twenty-sixth Day of March, 2019

Andrei Iancu
*Director of the United States Patent and Trademark Office*